(12) United States Patent
Bryant

(10) Patent No.: US 7,798,100 B2
(45) Date of Patent: Sep. 21, 2010

(54) ANIMAL HAY AND GRAIN FEEDER

(76) Inventor: Dennis Bryant, 2220 Camp La., Loganville, GA (US) 30052

( * ) Notice: Subject to any disclaimer, the term of this patent is extended or adjusted under 35 U.S.C. 154(b) by 105 days.

(21) Appl. No.: 12/019,988

(22) Filed: Jan. 25, 2008

(65) Prior Publication Data
US 2009/0188433 A1 Jul. 30, 2009

(51) Int. Cl.
A01K 5/01 (2006.01)
(52) U.S. Cl. .................. 119/60; 119/57.92; 119/61.1
(58) Field of Classification Search ............ 119/51.01, 119/57.92, 58, 60, 61.5, 73, 61.1
See application file for complete search history.

(56) References Cited

U.S. PATENT DOCUMENTS

| 3,043,267 A | 7/1962 | Blough | |
| 3,306,263 A | 2/1967 | Johnson | |
| 3,468,291 A * | 9/1969 | Allen | 119/51.12 |
| 3,826,231 A * | 7/1974 | Crawford et al. | 119/51.12 |
| 4,397,266 A | 8/1983 | Noland et al. | 119/73 |
| 4,440,112 A | 4/1984 | Lilyerd | 119/73 |
| 4,450,790 A * | 5/1984 | Stansbury, Jr. | 119/51.12 |
| 4,584,966 A | 4/1986 | Moore | 119/73 |
| 4,617,874 A * | 10/1986 | Zammarano | 119/51.12 |
| 4,671,210 A * | 6/1987 | Robinson et al. | 119/51.12 |
| 4,704,991 A | 11/1987 | Moore | 119/73 |
| 4,708,091 A | 11/1987 | Schafer | 119/73 |
| 4,805,560 A * | 2/1989 | Knego et al. | 119/51.12 |
| 4,883,022 A | 11/1989 | Barker | 119/73 |
| 4,922,858 A | 5/1990 | Ahrens | 119/73 |
| 4,976,222 A | 12/1990 | Cooke | 119/60 |
| 4,986,221 A | 1/1991 | Shaw | 119/73 |
| D317,666 S | 6/1991 | Haynes | D30/131 |
| 5,036,800 A | 8/1991 | Lischka | 119/75 |
| 5,138,980 A | 8/1992 | Ewing | 119/73 |
| 5,152,248 A | 10/1992 | Hart | 119/61 |
| 5,174,245 A | 12/1992 | Bishop | 119/73 |
| 5,189,985 A | 3/1993 | Brady et al. | 119/60 |
| 5,222,461 A * | 6/1993 | Haynes | 119/62 |
| 5,377,620 A | 1/1995 | Phillippi | 119/51.12 |
| 5,394,832 A | 3/1995 | Briley | 119/58 |
| 5,474,029 A | 12/1995 | Hofer | 119/73 |
| 5,509,377 A | 4/1996 | Franklin | 119/60 |
| 5,649,499 A | 7/1997 | Krietzman et al. | 119/52.1 |
| 5,669,328 A * | 9/1997 | Lanfranchi | 119/57.92 |
| 5,740,760 A | 4/1998 | Winebrenner | 119/73 |
| 5,813,363 A | 9/1998 | Snelling | 119/73 |
| 5,899,170 A | 5/1999 | Muckler | 119/58 |
| 5,954,011 A | 9/1999 | Martinez | 119/62 |
| 6,263,833 B1 | 7/2001 | Runyan et al. | 119/51.11 |
| D449,905 S | 10/2001 | Laurence | D30/121 |

(Continued)

OTHER PUBLICATIONS

Co-pending U.S. Appl. No. 12/057,488, filed Mar. 28, 2008 entitled "Animal Waterer".

Primary Examiner—Rob Swiatek
Assistant Examiner—Ebony Evans

(57) ABSTRACT

An animal hay and grain feeder may be provided comprising a housing having a central axis and configured to receive feed. A feeding plate having an opening configured to allow a portion of an animal's head to penetrate the feeding plate may be configured to fit within the housing and traverse and rotate about a central axis. In addition, a locking ring may be configured to contain the feeding plate within the housing.

14 Claims, 5 Drawing Sheets

U.S. PATENT DOCUMENTS

| | | | |
|---|---|---|---|
| 6,349,671 B1 * | 2/2002 | Lewis et al. | 119/51.02 |
| 6,363,885 B1 | 4/2002 | Akins et al. | 119/51.01 |
| 6,431,117 B1 | 8/2002 | Rauch | 119/58 |
| 6,446,574 B2 * | 9/2002 | Bickley | 119/55 |
| 6,497,195 B1 | 12/2002 | Beyers | 119/60 |
| 6,606,962 B2 | 8/2003 | Elliott | 119/62 |
| 6,619,232 B2 | 9/2003 | Johnston et al. | 119/73 |
| 6,729,264 B2 | 5/2004 | Duenow | 119/75 |
| 6,758,166 B2 | 7/2004 | Eugene Squire | 119/73 |
| 6,776,121 B2 | 8/2004 | Anderson | 119/75 |
| 6,923,142 B2 | 8/2005 | Kleinsasser | 119/62 |
| 6,951,189 B1 | 10/2005 | Lienemann | 119/60 |
| 6,981,469 B1 | 1/2006 | Welbourne | 119/75 |
| 7,007,633 B2 | 3/2006 | Dodds | 119/58 |
| 7,055,459 B2 | 6/2006 | Fehringer et al. | 119/54 |
| 7,152,551 B1 | 12/2006 | Fomby | 119/60 |
| 7,204,201 B2 | 4/2007 | Leombruno | 119/56.1 |
| 7,270,081 B2 * | 9/2007 | Park | 119/57.92 |
| 2006/0011528 A1 | 1/2006 | Ireland | 210/167 |
| 2008/0289580 A1 * | 11/2008 | Krishnamurthy | 119/51.11 |
| 2009/0241848 A1 | 10/2009 | Bryant | |

* cited by examiner

ANIMAL HAY AND GRAIN FEEDER

BACKGROUND

Animal hay and grain feeders have been used since man first started feeding domesticated animals. The most common problem encountered in hay and grain feeder design is stopping or reducing the amount of food wasted. Another problem particular to the keeping of horses is regulating how fast they eat their hay and grain. This becomes an important feature in horse feeders because, horses in nature, eat small amounts of grass and other forage in small bites all day long (approximately 22 hours/day). When horses eat their food from the vast majority of hay and grain feeders, their owners cannot regulate how quickly they eat their feed. This presents two major problems for the horse owner. Horses cannot regurgitate and are prone to colic and/or choke if they eat quickly. This can be a costly problem and many times fatal. If a feeder can slow the rate at which a horse eats, it helps with the aforementioned problems plus it will give the added benefit of more hours of grassing a day, when the horse is kept in a stall or a lot without grass to eat. Horses, being very intelligent animals, can become very bored by being confined in a small stall or pen. Boredom often causes behavioral problems like, pawing, chewing, ulcers, and/or pacing. The closer a feeder can come to natural grassing (smaller bites of food for a maximum number of hours) the better that feeder would be for horse and owner. Also, the perfect feeder would exhibit simplicity of design. Horses are large strong animals that can be very destructive. The fewer moving parts, springs, doors, locks, etc. and the tougher the material the feeder is made of, the better. The present invention addresses these problems and tests, with this style feeder, have performed as predicted. The current invention addresses all of the above mentioned problems.

SUMMARY OF THE INVENTION

Consistent with embodiments of the present invention an animal feeder is disclosed. The animal feeder may comprise a housing having a central axis and configured to receive feed.

A feeding plate having an opening configured to allow a portion of the animal's head to penetrate the feeding plate may be configured to fit within the housing and traverse and rotate on top of the feed about the central axis. In addition, a locking ring may be configured to contain the feeding plate within the housing.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
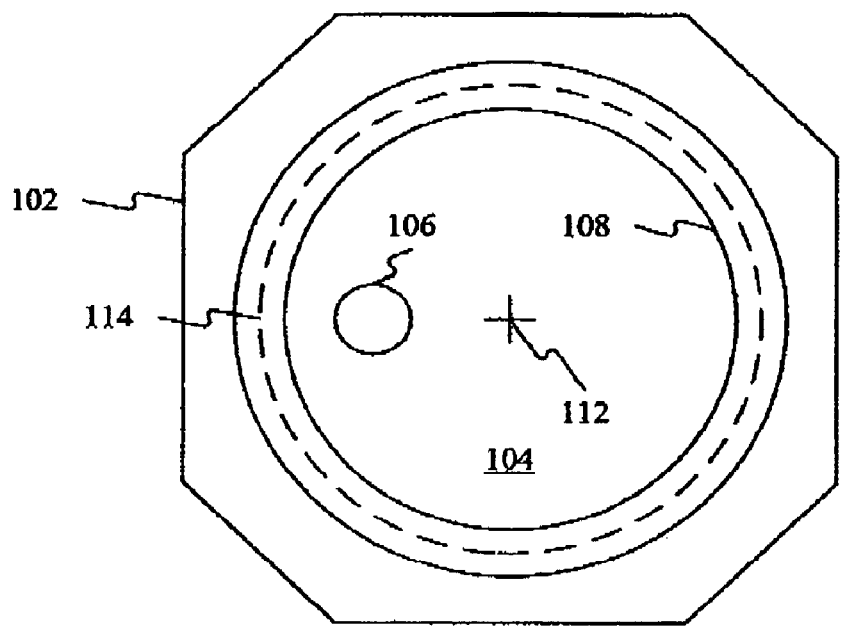
FIG. 1 shows a feeding ring oriented to a top plate having a locking ring.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Figure 2:
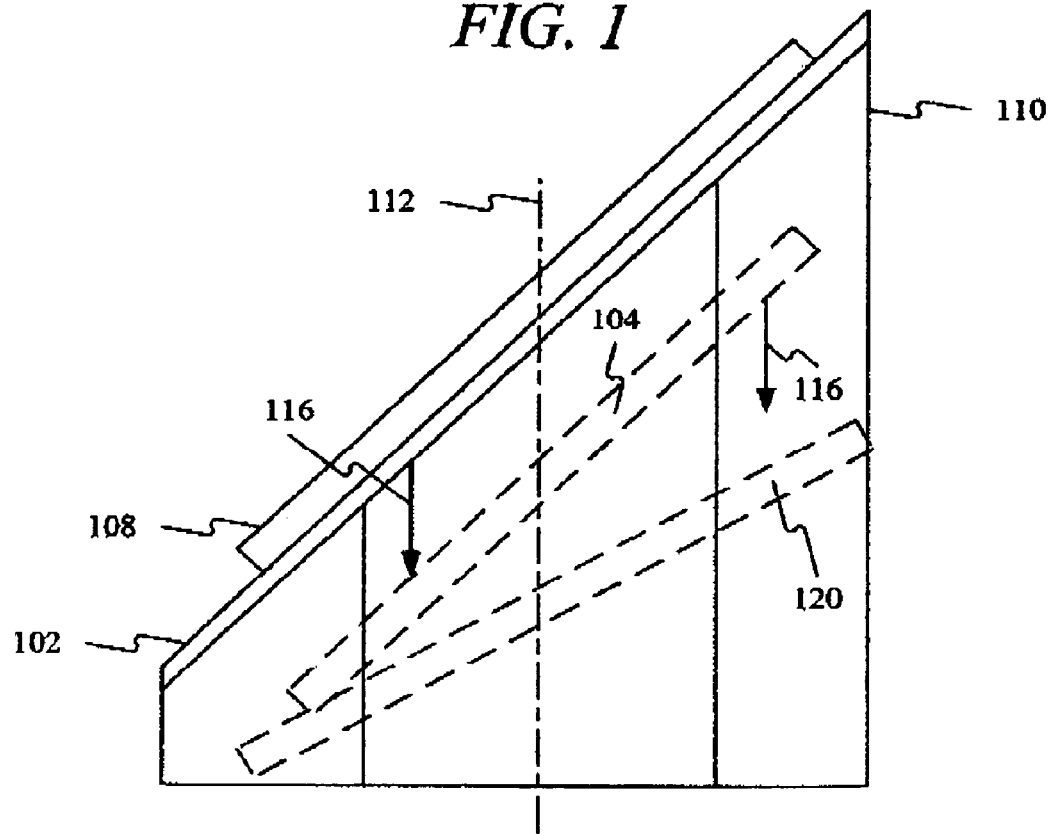
FIG. 2 shows an animal hay and grain feeder.

Turning now to the figures, as shown in FIGS. 1 and 2, an animal feeder may be provided. Consistent with embodiments of the present invention, the animal feeder may comprise a housing 110 configured to receive animal feed. Housing 110 may have a central axis 112 and a top plate 102 configured such that a feeding plate 104 may pass through an opening 114 located within top plate 102. Top plate 102 may be angled as shown in FIG. 2 to make it easier for the animal to eat from the animal feeder. For example, if the animal is a horse, top plate 102 may be angled so that when the horse is eating, top plate 102 may be perpendicular to the horse's mouth.

Feeding plate 104 may comprise an opening 106 configured to allow an animal access feed located within housing 110. The size and/or shape of opening 106 may be dependent on the size of the animal being fed. For instance, opening 106 may be smaller and shaped differently for a small horse as opposed to a large horse. In addition, feeding plate 104 may be configured so that feeding plate 104 may traverse central axis 112. For example, feeding plate 104 may be free floating within housing 110 and as the animal eats the feed, feeding plate 104 may traverse central axis 112 in a direction as indicated by arrows 116. For instance, once feed is placed within housing 110 feeding plate 104 may rest against top plate 102. As the animal eats the feed, feeding plate 104 may travel toward the bottom of housing 110 as shown by arrows 116.

Furthermore, feeding plate 104 may rotate about central axis 112. For example, as shown in FIG. 1 opening 106 is located at nine-o'clock, as the animal eats the feed, the animal may cause feeding plate 104 to rotate about central axis 112. For instance, as the animal eats the feed, feeding plate 104 may rotate clockwise and counter clockwise so that feed located beneath feeding plate 104, but not exposed by opening 116 becomes exposed and accessible by the animal.

Feeding plate 104 may be configured to be "free-floating" within housing 110. "Free-floating" may comprise the feeding plate 104's movement may be restricted by housing 110, top plate 102, and a locking ring 108. For example, after placing feed in housing 110 feeding plate 104 may rest upon the feed. As the animal eats the feed through opening 106, feeding plate 104 may rotate as the animal moves its head or other body part in contact with opening 106. For instance, after placing the feed in housing 110 and covering the feed with feeding plate 104, opening 106 may be located at a first position (e.g. nine-o'clock). As the animal eats and moves its head (or noses around), feeding plate 104 may rotate in response to the animal so that opening 106 may be relocated to a second position (e.g. twelve-o'clock, two-o'clock, etc.) so the animal may access feed located under feeding plate 104 but not previously exposed by opening 106.

In addition, as the animal eats the feed, feeding plate 104 may traverse central axis 112 as indicated by arrows 116 and pivot as feed under a portion of feeding plate 104 is eaten. For example, as the animal eats the feed at one location (e.g. housing 110's front), feeding plate 104 may pivot to a new position as indicated by feeding plate 120.

During free-floating operation, feeding plate 104 may remain substantially parallel to top plate 102. For example, as feeding plate 104 rotates and pivots within housing 110, feeding plate 104 may remain in an orientation so that the animal may not be able to place its head, arms, legs, or other body parts under feeding plate 104. In addition, as feeding plate 104 rotates and pivots within housing 110, feeding plate 104 may remain in an orientation so that the animal may not be able to grip and/.or remove feeding plate 104 with its mouth, paw, arms, etc.

Furthermore, a shaft 732 may be used to cause feeding plate 704 to rotate and traverse about a central axis 712. For example, hole 734 may be in communication with feeding plate 704 via a shaft 732 For instance, shaft 732 affixed to the bottom center of feeding plate 704 is configured to traverse central axis 712 and pass through hole 734 in bottom center of feeding well 722 thereby eliminating the ability of the feeding plate 704 to traverse central axis 712 in any orientation other than parallel to the bottom of feeding well 722. Feeding plate 704 may have freedom of movement along the shaft's axis. For example, as feeding plate 704 rotates and as the feed beneath feeding plate 704 is consumed by the animal, feeding plate 704 may traverse central axis 712 unobstructed.

Consistent with embodiments of the invention, top plate 102 may be removable from housing 110 so that feed and feeding plate 104 may be placed in housing 110. In these embodiments, feeding plate 104 may be configured so that feeding plate 104 will not fit though hole 114. Consistent with embodiments of the invention, feeding plate 104 may be secured within housing 110 by locking ring 108. In these embodiments, feeding plate 104 may be configured to pass through hole 114 and top plate 102 may not require removal to add feed to the animal feeder.

Figure 3:
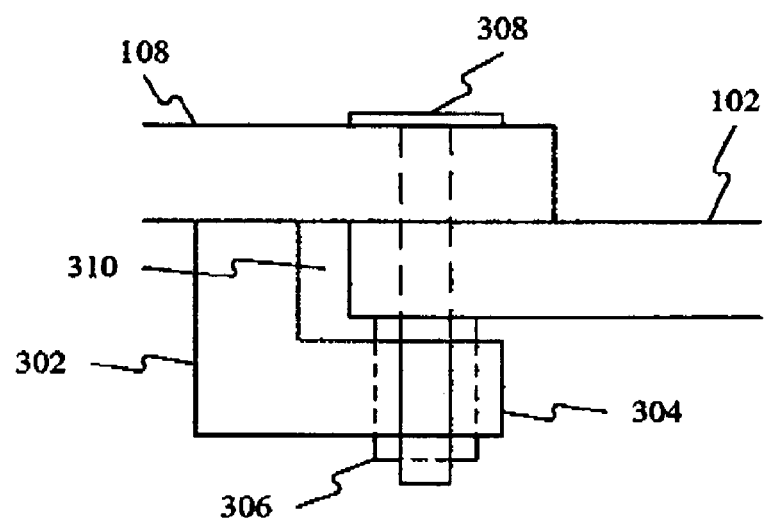
FIG. 3 shows a tab configuration for securing the locking ring to the top plate.
Figure 4:
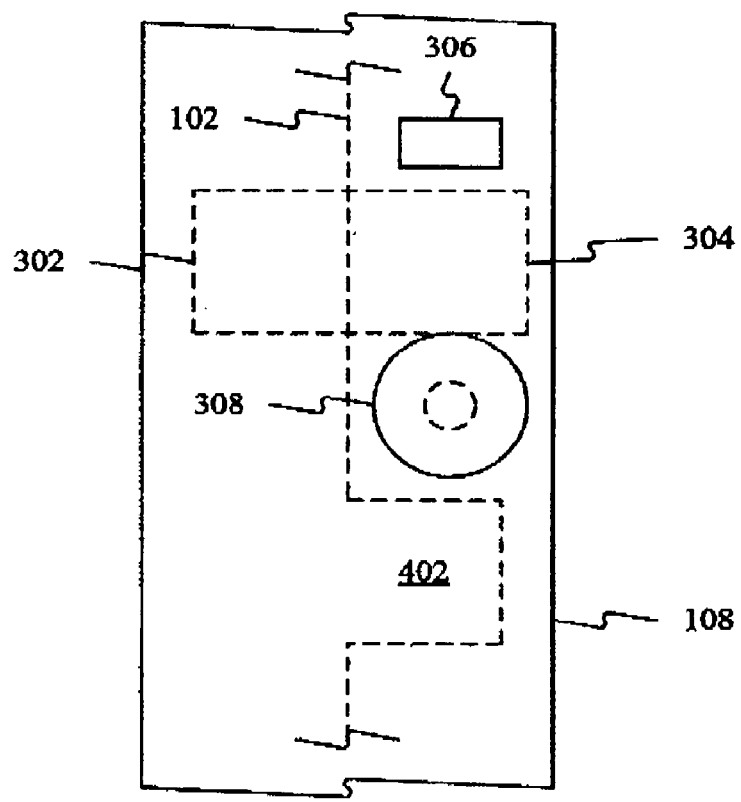
FIG. 4 shows a plan view of the tab configuration shown in FIG. 3.

Locking ring 108 may be configured to attach to top plate 102 and overlap hole 114. By overlapping hole 114 feeding plate 104 may be allowed to pass through hole 114 during installation, but after securing locking ring 108, feeding plate 104 may no longer pass through hole 114. Examples of a locking mechanism for securing locking ring 108 to top plate 102 are shown in FIGS. 3 and 4. For example, locking ring 108 may contain a tab 302 configured to allow a tab portion 304 to rest beneath top plate 102 so that a portion of top plate 102 may be located between tab portion 304 and locking ring 108. To be able to get tab portion 304 beneath top plate 102, a receiving slot 402 may be located within top plate 102. (See FIG. 4). Once tab portion 304 has passed through receiving slot 402, locking ring 108 may be positioned so that tab portion 304 may rest against a stopping mechanism 306. A pin 308 may pass through top plate 102 to hinder tab portion 304 from being positioned by an animal at receiving slot 402. Note that pin 308 may be configured so that the animal cannot grip (i.e. bite or grip with a paw) pin 308 and remove it. For example, pin 308 may contain threads and locking ring 108 or top plate 102 may be tapped to receive pin 308. In addition, pin 308 may contain a head that may be substantially flat.

Embodiments of the invention may comprise at least one protrusion extending from tab portion 304 so as to grip top plate 102, for example, by being received by at least one indentation located on top plate 102. The protrusion received by the indentation may hinder movement of the locking ring 108.

Figure 5:
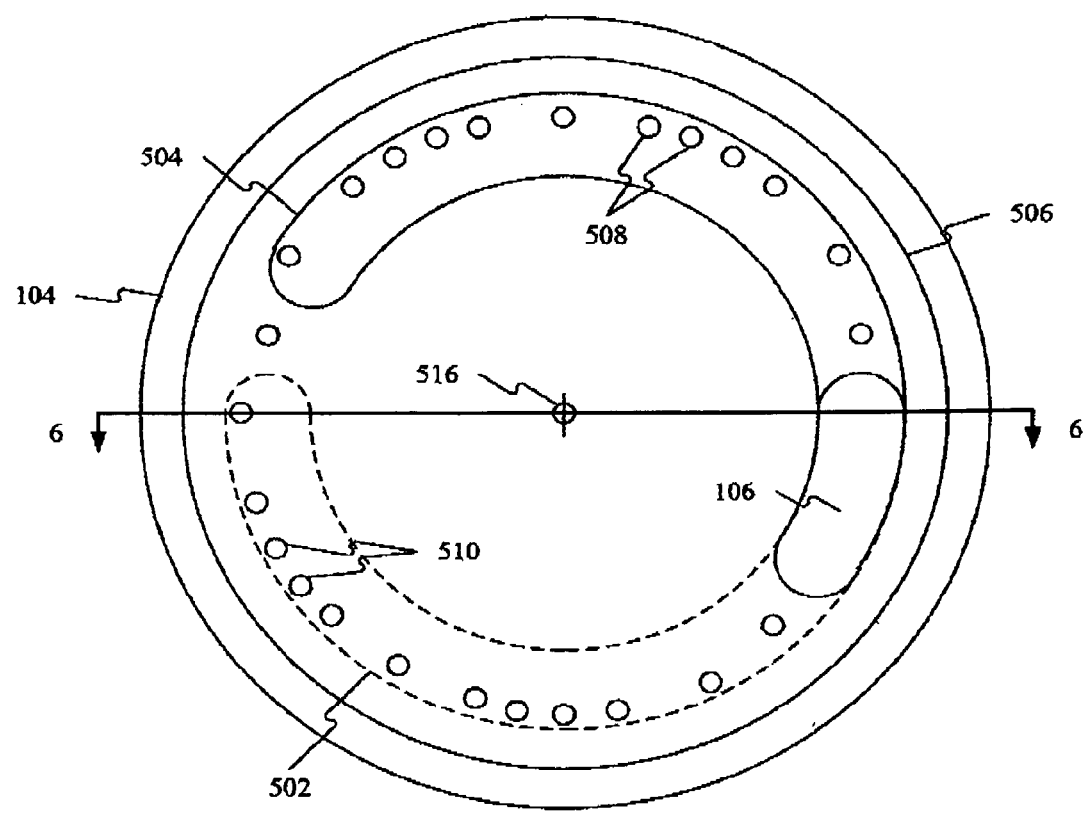
FIG. 5 shows a feeding ring having an adjustable opening.
Figure 6:
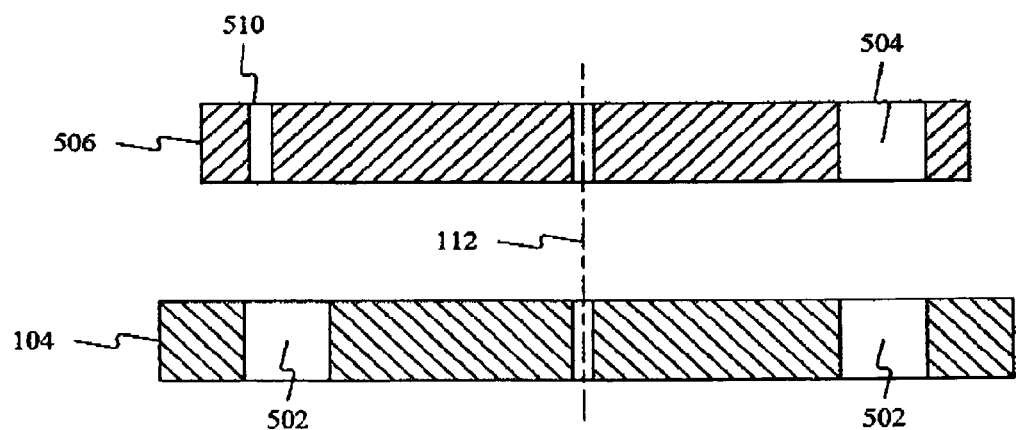
FIG. 6 shows a section view of the feeding ring shown in FIG. 5.

While FIG. 1 shows opening 106 as having a fixed opening area, opening 106 may be adjustable. For example, FIG. 5 shows feeding plate 104 having an elongated opening 502 and various metering holes 510. FIG. 6 is a sectional view of FIG. 5. Located on top of feeding plate 104 may be an adjustment plate 506 similar to feeding plate 104 in that adjustment plate 506 may comprise an opening 504 and various increment holes 508. Opening 106's opening area may be increased or decreased in size by rotating adjustment plate 506 about point 516. Upon selecting a desired opening area for opening 106 a pin or other locking member may be inserted through any one of holes 508 and into one of holes 510 such that adjustment plate 506 rotation becomes fixed.

The animal feeder and its various components may be constructed of high impact plastics, corrosion resistant metals, other type metals, polymers, ceramics, or any other material capable of withstanding the abuse that may be inflicted upon the feeder by an animal. For example, the feeder may be used to feed horses and high impact plastic may be used such that should the horse kick the feeder, the feeder will not dent thereby restricting feeding plate 104's motion.

Figure 7:
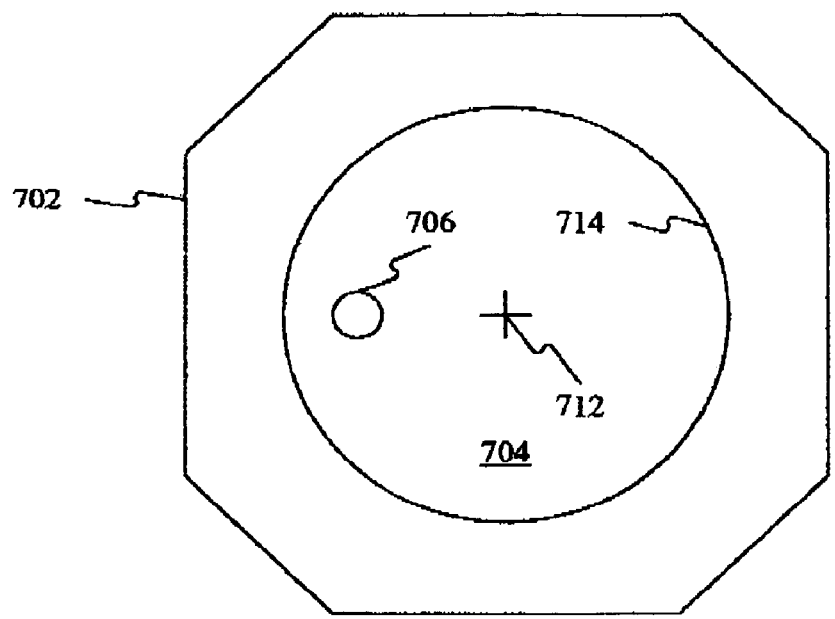
FIG. 7 shows a feeding ring oriented to a top plate.
Figure 8:
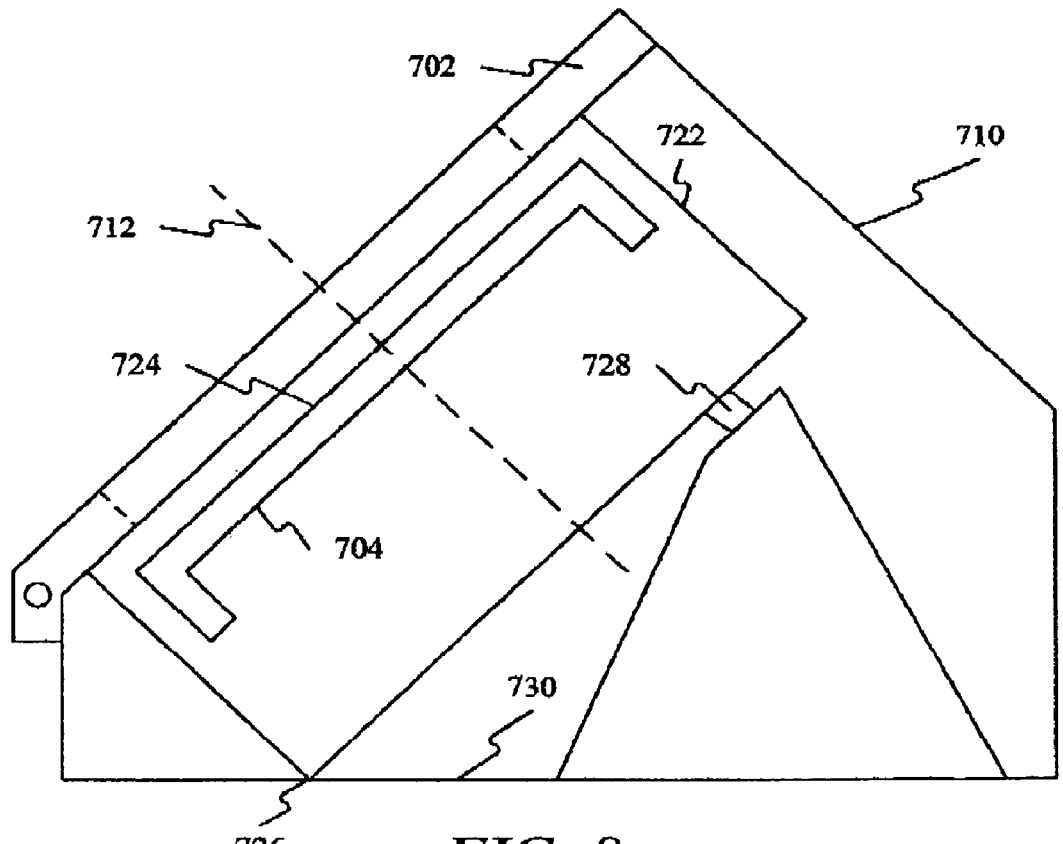
FIG. 8 shows an animal hay and grain feeder.
Figure 9A:
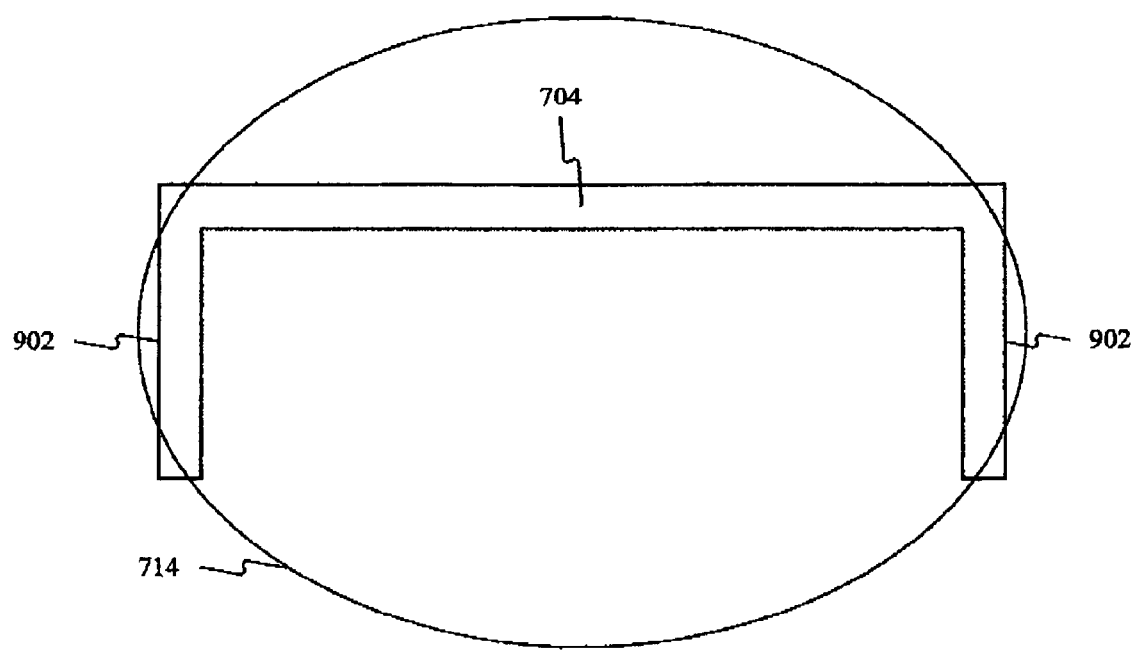
FIGS. 9A and 9B show feeding rings having parameter flanges.
Figure 9B:
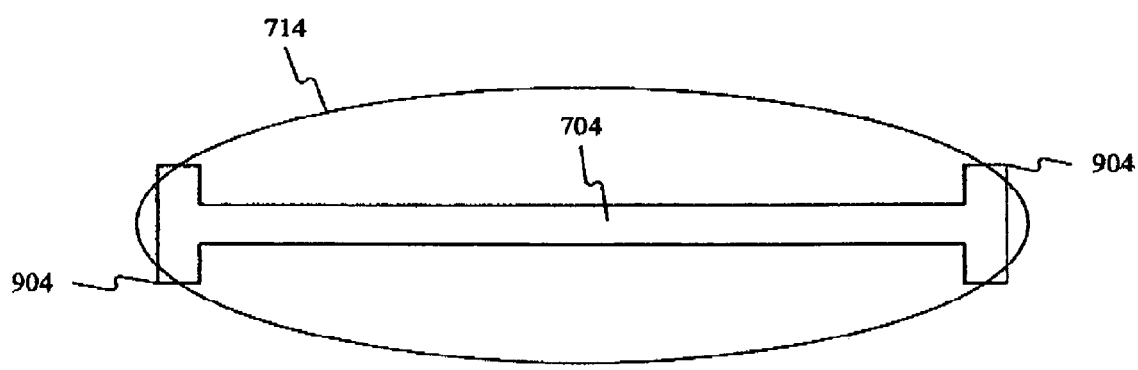

Turning now to FIGS. 7-9, an animal feeder may be provided. Consistent with embodiments of the present invention, the animal feeder may comprise a housing 710 configured to receive feed. Housing 710 may have a feed well 722 having a central axis 712. The animal feeder may further comprise a cover plate 702, configured to connect to housing 710, having an opening 714. A feeding plate 704 may have an opening 706 configured to allow a portion of an animal's head to penetrate feeding plate 704. Feeding plate 704's may be configure so that it will not pass through opening 714 when feeding plate 704 is not parallel to cover plate 702.

One instance when this occurs is when feeding plate 704's hydraulic diameter is greater than opening 714's hydraulic diameter. Feeding plate 704's hydraulic diameter is four times the surface area of a face 724 divided by the parameter of face 724. Opening 714's hydraulic diameter is four times the surface area of opening 714 divided by opening 714's parameter. For example, suppose opening 714 is a 12 inch by 12 inch square, then opening 714's surface are is 144 square inches and opening 714's parameter is 48 inches. Then opening 714's hydraulic diameter is 12 inches and the maximum distance between the corners is 16.97 inches. Suppose feeding plate 704 is a circle having a diameter of 18 inches, then feeding plate 704's surface area is 254.34 square inches and feeding plate 704's parameter is 56.52. Therefore, feeding plate 704's hydraulic diameter is 18, which is greater than opening 714's hydraulic diameter.

Another instance when feeding plate 704 will not pass through opening 714 when feeding plate 704 is not parallel to cover plate 702 is when feeding plate 704's parameter has a thickness so that feeding plate 704 will not pass through opening 714 when feeding plate 704 is not parallel to cover plate 702. For example, as show in FIGS. 9A and 9B, feeding plate 704 may comprise flanges 902 and 904. Flanges 902 and 904 may be configured such that when feeding plate 704 is at an angle (for illustration purposes 90 degrees) to opening 714, flanges 902 and 904 prevent feeding plate 704 from passing through opening 714. In this instance feeding plate 704's hydraulic diameter may be less than opening 714's hydraulic diameter and feeding plate 704 may not pass through opening 714. Note that in FIGS. 9A and 9B the curvature of opening 714 has been exaggerated for clarity.

Cover plate 702 may be connected to the housing through various connection methods including but not limited to a hinge(s) and hook(s). For example, cover plate 702 may include a hook and housing 710 may include a hook to be fastened to cover plate 702's hook or directly to cover plate 702. Also housing 710's hook may fasten directly to cover plate 702.

As described above in FIGS. 5 and 7 feeding plate 704 may include at least one adjusting pin 736 configured to alter the usable size of opening 706. Feeding plate 704 may also include an adjustment pin 736 configured to allow for incremental or continuous adjustment of the opening 706.

While certain embodiments of the invention have been described, other embodiments may exist. The invention's scope is indicated by the following claims. Furthermore, while the specification has been described in language specific to structural features and/or methodological acts, the claims are not limited to the features or acts described above. Rather, the specific features and acts described above are disclosed as examples for embodiments of the invention.

What is claimed is:

1. An animal hay and grain feeder comprising:
   a housing configured to receive feed, the housing having a central axis;
   a feeding plate having an opening configured to allow a portion of an animal's head to penetrate the feeding plate, the feeding plate configured to fit within the housing and traverse and rotate about the central axis;
   an adjusting plate configured to alter the size of the opening, wherein the adjusting plate further comprises an adjustment pin, the adjustment pin configured to allow for incremental adjustment of the adjusting plate; and
   a locking ring configured to contain the feeding plate within the housing.

2. The hay and grain feeder of claim 1, wherein the housing further comprises a top plate, the housing and top plate configured wherein the feeding plate remains substantially parallel to the top plate.

3. The hay and grain feeder of claim 1, wherein the locking ring comprises at least on tab configured to secure the locking ring to the housing.

4. The hay and grain feeder of claim 3, further comprising at least one locking pin configured to lock the at least one tab in place thereby keeping the locking ring from rotating.

5. The hay and grain feeder of claim 4, wherein the at least one locking pin is further configured wherein an animal cannot remove the at least one locking pin.

6. The hay and grain feeder of claim 1, wherein the feeding plate opening is configured to be adjustable.

7. The hay and grain feeder of claim 1, further comprising a shaft configured to;
   cause the feeding plate to traverse the central axis parallel with bottom of the housing; and
   cause the feeding plate to traverse the central axis parallel with bottom of the housing.

8. An animal bay and grain feeder comprising:
   a housing configured to receive feed, the housing having a feed well, the feed well having a central axis;
   a cover plate having an opening, the cover plate configured to connect to the housing;
   a feeding plate having an opening configured to allow a portion of an animal's head to penetrate the feeding plate, wherein a feeding plate's parameter has a thickness so that the feeding plate will not pass through the cover plate opening when the feeding plate is not parallel to the cover plate; and
   an adjusting plate configured to alter the size of the feeding plate opening, wherein the adjusting plate comprises an adjustment pin configured to allow for continuous adjustment of the adjusting plate.

9. The hay and grain feeder of claim 8, wherein the cover plate is connected to the housing via a hinge.

10. The bay and grain feeder of claim 8, wherein the cover plate further comprises a first hook and the housing further comprises as second hook, the first hook configured to engage the second hook when the cover plate is connected to the housing.

11. The bay and grain feeder of claim 8, wherein a feeding plate's diameter that is greater than a cover plate's opening diameter.

12. An animal hay and grain feeder comprising:
    a housing configured to receive feed, the housing having a feed well, the feed well having a central axis;
    a cover plate having an opening, the cover plate connected to the housing via a hinge, the cover plate comprising a first hook and the housing comprising a second hook configured to engage the first hook when the cover plate is connected to the housing; and
    a feeding plate having an opening configured to allow a portion of an animal's head to penetrate the feeding plate, wherein a feeding plate's parameter has a thickness so that the feeding plate will not pass though the cover plate opening when the feeding plate is not parallel to the cover plate.

13. The animal hay and grain feeder of claim 12 further comprising an adjusting plate configured to alter the size of the feeding plate opening, wherein the adjusting plate comprises an adjustment pin configured to allow for continuous adjustment of the adjusting plate.

14. The animal hay and grain feeder of claim 12 further comprising means to alter the size of the feeding plate opening.

* * * * *